Feb. 17, 1925

J. B. McGINLEY

VALVE DEVICE

Filed June 15, 1923

1,526,995

Inventor
James B. McGinley
By his Attorneys
Edgar Tate &Co.

Patented Feb. 17, 1925.

1,526,995

UNITED STATES PATENT OFFICE.

JAMES B. McGINLEY, OF NEWARK, NEW JERSEY.

VALVE DEVICE.

Application filed June 15, 1923. Serial No. 645,492.

*To all whom it may concern:*

Be it known that I, JAMES B. McGINLEY, a citizen of the United States, and residing at Newark, in the county of Essex and State of New Jersey, have invented certain new and useful Improvements in Valve Devices, of which the following is a specification, such as will enable those skilled in the art to which it appertains to make and use the same.

This invention relates to valve devices and particularly to combination hot and cold water valves of this class; and the object of the invention is to provide a valve device of the class specified of simple construction and operation, and which by reason of its construction may be used to control the discharge of either hot or cold water or a combination of hot and cold water; and with these and other objects in view, the invention consists in a valve device of the class specified constructed as hereinafter described and claimed.

The invention is fully disclosed in the following specification, of which the accompanying drawing forms a part, in which the separate parts of my improvement are designated by suitable reference characters in each of the views, and in which:—

Figure 1:
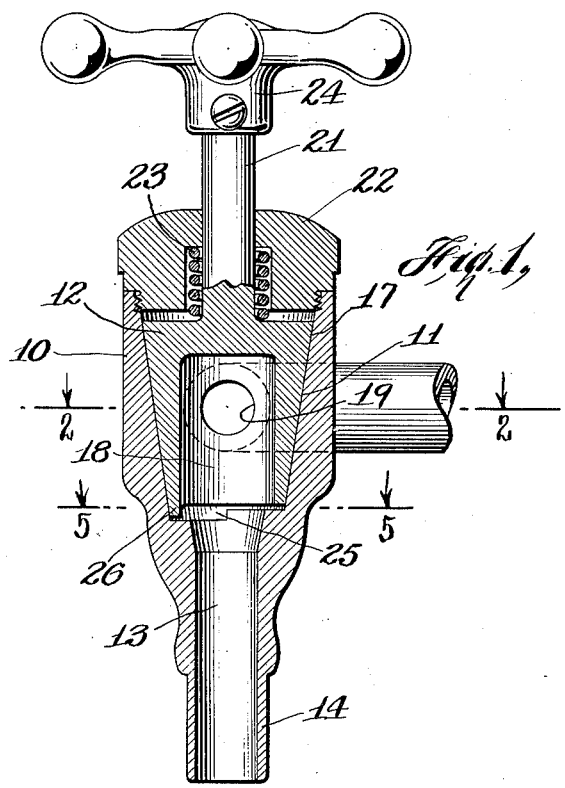
Fig. 1 is a sectional view through my improved valve device with part of the construction shown in full lines.

In practice, I provide a valve body or casing 10, which in the construction shown is tubular in form and provided with a comparatively large tapered bore 11, forming a seat for a conical valve 12 and communicating with the bore 11, is a discharge passage 13 opening through a tubular nozzle 14 at the bottom of the casing 10. At the opposite sides of the casing 10, are hot and cold water pipes 15 and 16, the passages of which communicate with the bore 11, and the pipes 15 and 16 in the construction shown are formed integral with the casing 10, but this is not absolutely necessary.

Figure 2:
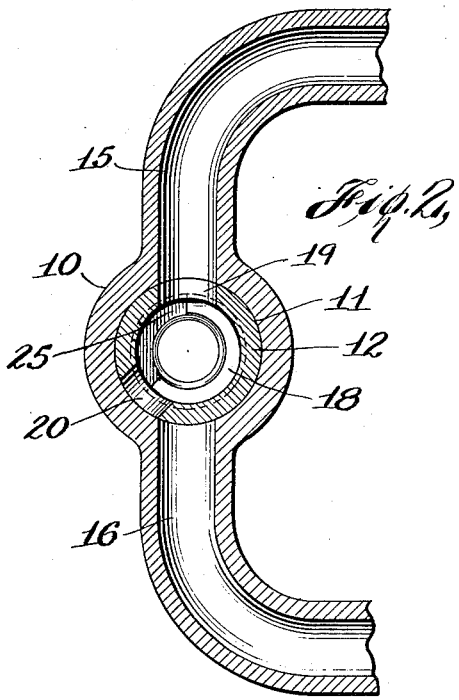
Fig. 2 is a section on the line 2—2 of Fig. 1.
Figure 3:
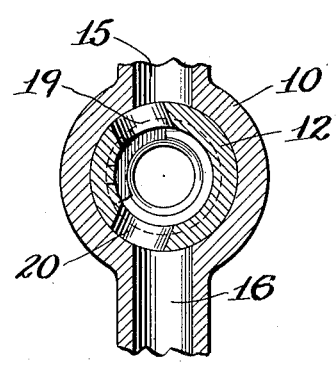
Figs. 3 and 4 are views similar to Fig. 2 but showing the valve in different positions; and, Fig. 5 is a section on the line 5—5 of Fig. 1.
Figure 5:
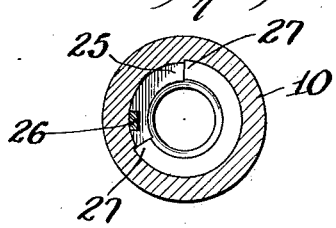
Figure 4:
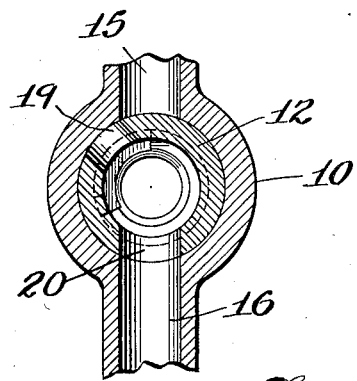

The valve 12 in the construction shown or the outer face 17 thereof is tapered to correspond with a seat in the bore 11 to form a watertight connection, and said valve is provided with a mixing chamber 18 and with ports 19 and 20 adapted to register with the passages of the pipes 15 and 16 respectively, as shown in Figs. 2, 3 and 4 of the drawing. The valve 12 is provided with a stem 21 which passes upwardly through a cap 22 detachably mounted in connection with the upper end of the casing 10, said cap being recessed to receive a spring 23 which operates to normally hold the valve 12 in a seated position, and at the upper end of the stem 21 is a handle member 24 of any kind or class, by means of which the valve 12 may be rotated.

The mixing chamber 18 opens downwardly through the valve 12 and communicates with the discharge passage 13, and in the construction shown, the casing 10 at the bottom of the bore 11 thereof is recessed as shown at 25 to receive a projection 26 on the bottom face of the valve 12, and this construction operates to limit the rotary movement of the valve 12 in two directions, the projection 26 cooperating with the shoulders 27 formed by the recess 25.

It will be understood that the valve 12 may be moved into position to fully open the hot water supply as shown in Fig. 2 of the drawing or to fully open the cold water supply as shown in Fig. 4 of the drawing, or to partially open both the hot and cold water supplies as indicated in Fig. 3 of the drawing as well as to shut off both hot and cold water supplies.

With my improved valve construction, it will be apparent that the use of gaskets, packing rings or the like are eliminated and the valve device by reason of its construction will be strong and durable and able to render long service, and is composed of three main parts, namely the casing, the valve and the body. It will be noted that sufficient clearance is allowed to take up for the wear of the valve 12 in the tapered bore 11, and as above stated, while I have shown a specific form of casing, it will be apparent that I am not necessarily limited in this respect, and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A valve and water discharge device of the class described comprising a substantially cylindrical casing having a reduced downwardly directed extension forming a discharge nozzle, a tapered bore in the upper end portion of the casing and opening into a reduced bore through said extension, said casing being provided with ports opening into the opposite sides of the bore thereof, a conical valve element mounted in and seating in the tapered bore of the casing, said valve element being provided with an aperture of greater diameter than the bore of said extension and extending through the greater portion of the depth of the valve, ports in said valve element arranged at an angle of substantially 135 degrees to each other and opening into the aperture thereof and adapted to register with the ports in said casing whereby the communication between the casing ports and the discharge of the valve may be closed by said element, or either of said ports may be separately placed in communication with the discharge, and whereby both casing ports may be placed in communication with said discharge.

2. A valve and water discharge device of the class described comprising a substantially cylindrical casing having a reduced downwardly directed extension forming a discharge nozzle, a tapered bore in the upper end portion of the casing and opening into a reduced bore through said extension, said casing being provided with ports opening into the opposite sides of the bore thereof, a conical valve element mounted in and seating in the tapered bore of the casing, said valve element being provided with an aperture of greater diameter than the bore of said extension and extending through the greater portion of the depth of the valve, ports in said valve element arranged at an angle of substantially 135 degrees to each other and opening into the aperture thereof and adapted to register with the ports in said casing whereby the communication between the casing ports and the discharge of the valve may be closed by said element, or either of said ports may be separately placed in communication with the discharge, and whereby both casing ports may be placed in communication with said discharge, a detachable cap mounted in the casing and through which the stem of the valve element passes, and a spring mounted on the valve stem and extending into a recess in said cap and cooperating with the valve element to normally retain the same in a seated position.

3. A valve and water discharge device of the class described comprising a substantially cylindrical casing having a reduced downwardly directed extension forming a discharge nozzle, a tapered bore in the upper end portion of the casing and opening into a reduced bore through said extension, said casing being provided with ports opening into the opposite sides of the bore thereof, a conical valve element mounted in and seating in the tapered bore of the casing, said valve element being provided with an aperture of greater diameter than the bore of said extension and extending through the greater portion of the depth of the valve, ports in said valve element arranged at an angle of substantially 135 degrees to each other and opening into the aperture thereof and adapted to register with the ports in said casing whereby the communication between the casing ports and the discharge of the valve may be closed by said element, or either of said ports may be separately placed in communication with the discharge, and whereby both casing ports may be placed in communication with said discharge, a detachable cap mounted in the casing and through which the stem of the valve element passes, a spring mounted on the valve stem and extending into a recess in said cap and cooperating with the valve element to normally retain the same in a seated position, and the ports of the casing opening into tubular members projecting from the casing.

4. A valve and water discharge device of the class described comprising a substantially cylindrical casing having a reduced downwardly directed extension forming a discharge nozzle, a tapered bore in the upper end portion of the casing and opening into a reduced bore through said extension, said casing being provided with ports opening into the opposite sides of the bore thereof, a conical valve element mounted in and seating in the tapered bore of the casing, said valve element being provided with an aperture of greater diameter than the bore of said extension and extending through the greater portion of the depth of the valve, ports in said valve element arranged at an angle of substantially 135 degrees to each other and opening into the aperture thereof and adapted to register with the ports in said casing whereby the communication between the casing ports and the discharge of the valve may be closed by said element, or either of said ports may be separately placed in communication with the discharge, and whereby both casing ports may be placed in communication with said discharge, a detachable cap mounted in the casing and through which the stem of the valve element passes, a spring mounted on the valve stem and extending into a recess in said cap and cooperating with the valve element to normally retain the same in a seated position, and the ports of the casing opening into tubular members projecting from the casing, and means for limiting the movement of the valve element in the casing in two directions.

In testimony that I claim the foregoing as my invention I have signed my name this 13th day of June, 1923.

JAMES B. McGINLEY.